Feb. 17, 1925.
H. ROSENDAL DAM
1,526,321
BATTERY BOX
Filed July 8, 1922  2 Sheets-Sheet 1
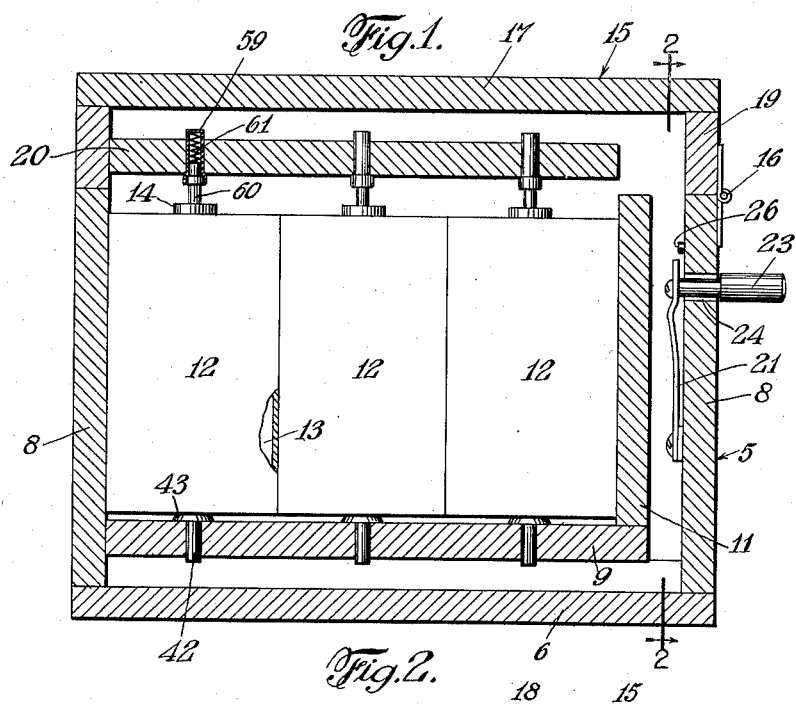

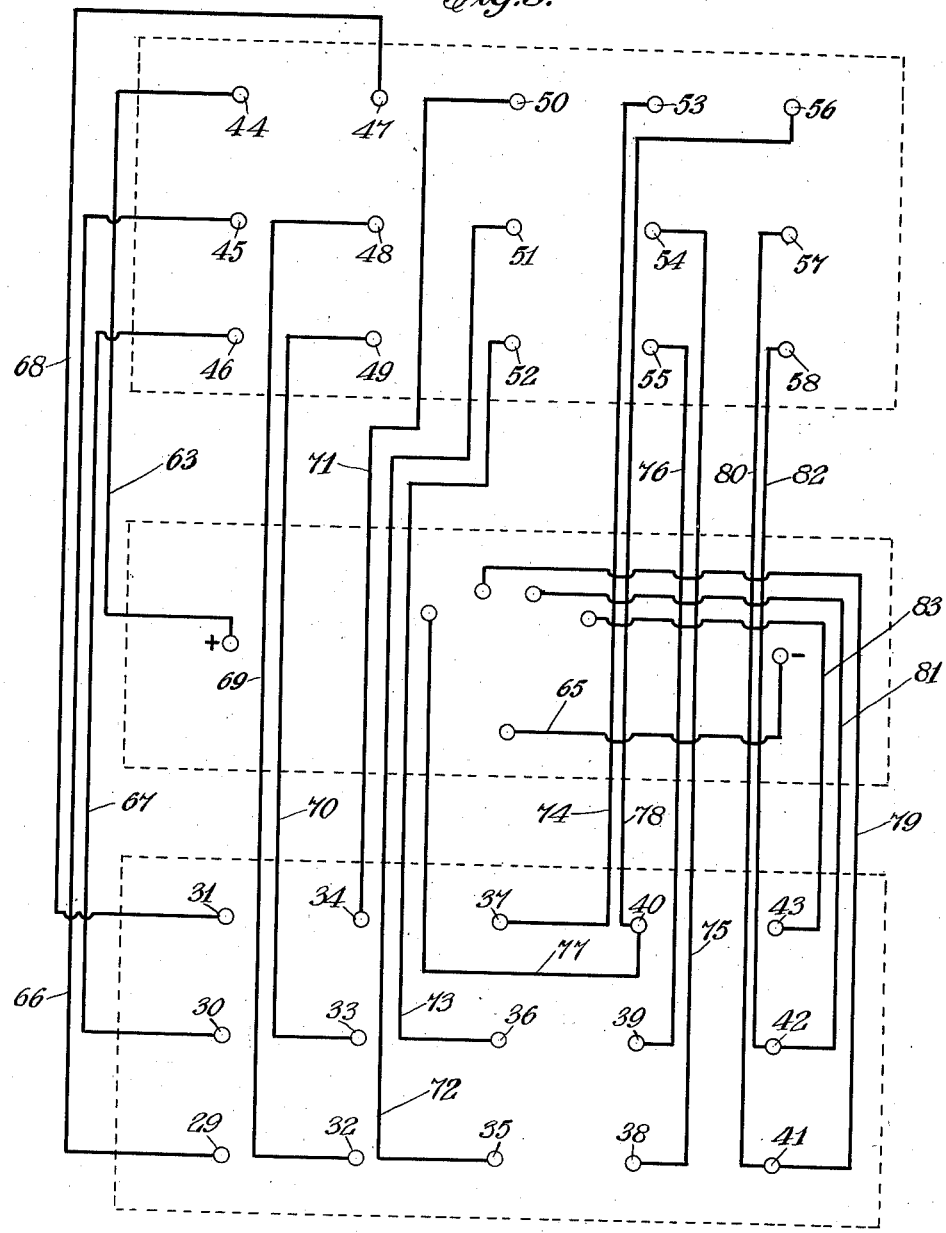

Patented Feb. 17, 1925.

1,526,321

UNITED STATES PATENT OFFICE.

HENRY ROSENDAL DAM, OF JAMAICA, NEW YORK, ASSIGNOR TO FRANCO ELECTRIC CORPORATION, A CORPORATION OF NEW YORK.

BATTERY BOX.

Application filed July 8, 1922. Serial No. 573,708.

*To all whom it may concern:*

Be it known that I, HENRY ROSENDAL DAM, a subject of the King of Denmark, residing at Jamaica, county of Queens, Long Island, New York, have invented certain new and useful Improvements in Battery Boxes, of which the following is a specification.

This invention relates to electric batteries and has particular reference to boxes or containers therefor, in which are arranged a plurality of cells adapted to be connected in circuit.

An important object of the invention is to provide a box of the character mentioned so constructed that one or a plurality of cells may be removed to permit renewal thereof without disturbing any portion of the various electrical conductors by which the several cells are maintained in circuit.

A further object of the invention is to provide in a device of the character mentioned a means whereby one or more of the cells may be cut out of circuit with the remaining cells, in order to vary or regulate the voltage of the available circuit.

Another object of the invention is to provide a box or container, in which the various cells thereof are so connected as to enable any given cell or number of cells to be tested without disturbing any portion of the electrical system by which the cells are maintained in circuit.

Other objects and certain advantages of the invention will become apparent from the following description taken in connection with the accompanying drawings, in which—

Fig. 1 is a transverse sectional view through a battery box embodying my invention.

Fig. 2 is a longitudinal sectional view taken on line 2—2 of Fig. 1.

Fig. 3 is a diagrammatic view illustrating the various conductors constituting the electric circuit by which the several cells are maintained in electrical connection with each other.

In the drawing, wherein is shown what I at present consider the preferred form of my invention, the numeral 5 indicates a box or container having a base 6, end walls 7, and side walls 8. Within the container there is arranged a false bottom 9, which is spaced an appreciable distance from the base 6, and supported in a spaced relation with respect thereto by means of transversely disposed strips or blocks 10.

With the false bottom 9 there is associated a vertically disposed divisional wall 11, which is spaced an appreciable distance from the rear longitudinal side 8 of the box. It will be noted that the space afforded between the base 6 and the false bottom 9 is in direct communication with the space afforded between the rear side wall 8 of the box and the divisional wall 11, this communication being provided to accommodate certain electrical conductors hereinafter more particularly referred to.

The false bottom 9 is adapted to receive thereupon a plurality of cells 12, each of which is in the form of a zinc container 13, which forms one pole thereof, whereas the usual form of carbon electrode 14 constitutes the other pole. Any desired number of these cells may be employed, according to the size of the container 5, but in this instance I have shown a container which is adapted to carry fifteen such cells, these cells being so connected with each other, as will more readily appear when considering the diagram of Fig. 3, that either twelve, thirteen, fourteen or the total number thereof may be placed in circuit.

The container 5 is provided with a closure 15 operatively connected to the rear wall 8 by means of hinges 16. The closure 15 comprises a top 17, end sections 18 and side member 19. Within the closure 15 there is arranged a terminal bearing plate or support 20, which is suitably retained in proper position and adapted to move with the closure 15 when the same is open with respect to the container 5.

It will be noted that the terminal bearing plate 20 is spaced an appreciable distance from the top member 17, and that the space thus afforded is maintained in communication with the space afforded between the rear wall 8 of the container 5 and the divisional wall 11 thereof.

To the rear wall 8 of the container 5 there is pivotally connected a contact arm 21, the arm 21 being journaled upon a terminal 22. As a means for operating the contact arm 21 there is provided a handle 23 which is secured to the arm 21 relatively near the end thereof and adapted to operate through an arcuate shaped slot 24 formed in the rear wall 8 of the container. As the arm 21 is oscillated upon its pivotal connection 22, its free end is adapted to be moved into engagement with the several contacts 25, 26, 27 and 28, carried by the rear wall 8 of the container.

The false bottom 9 carries a plurality of contacts indicated by the numerals 29, 30, 31, 32, 33, 34, 35, 36, 37, 38, 39, 40, 41, 42 and 43, upon which the several cells 12 are adapted to rest. Each of the contacts is in the form of a stem 42, having a cap 43, the stem 42 being projected through the false bottom 9 and extended an appreciable distance into the space afforded between the base 6 and the false bottom 9. By the contact supporting plate 20 are carried a plurality of spring-pressed contacts, 44, 45, 46, 47, 48, 49, 50, 51, 52, 53, 54, 55, 56, 57 and 58, which correspond in number to the contacts 31 to 41, inclusive. Each of the spring pressed contacts comprises a casing 59, carrying a plunger 60 which is adapted to engage the carbon electrodes 14 of the cells and is held in intimate engagement therewith by means of a compression spring 61, carried within the casing 59.

To the rear wall 8 of the container 5, there is connected a binding post 62, which in turn is connected with the spring pressed contact 44, by means of a conductor 63. A second binding post 64 is carried also by the rear wall 8 of the container 5, this binding post being connected to the pivot member 22 of the contact arm 21 by means of a conductor 65. The binding posts 62 and 64 are adapted to be connected in circuit with any particular form of apparatus with which the battery, carried by the battery box is adapted to be used.

With the battery connected in circuit with an apparatus and with the contact arm 21 engaging the contact 25, and the closure 15 maintained in the position shown in Fig. 1, the circuit may be traced through the conductor 63 to the contact 44, through the associated cell 12 to the contact 29, through the conductor 66 to the contact 45, through its associated cell to the contact 30, through the conductor 67 to the contact 46, through its associated cell to the contact 31, through the conductor 68 to the contact 47, through the cell associated therewith to the contact 32, through the conductor 69 to the contact 48, through the associated cell to the contact 33, through the conductor 70 to the contact 49, through the associated cell to the contact 34, through the conductor 71 to the contact 50, through the associated cell to the contact 35, through the conductor 72 to the contact 51, through its associated cell to the contact 36, through the conductor 73 to the contact 52, through its associated cell to the contact 37, through the conductor 74 to the contact 53, through its associated cell to the contact 38, through the conductor 75 to the contact 54, through the associated cell to the contact 39, through the conductor 76 to the contact 55, through its associated cell to the contact 40, through the conductor 77 to the contact 25, through the contact arm 21 to the pivotal connection 22 thereof, and thence to the binding post 64 through the conductor 65.

By following the course of the current, as above described, it will be noted that only twelve of the fifteen cells are placed in circuit when the contact arm 21 is maintained in engagement with the contact 25. By moving the contact arm 21 into engagement with the contact 26, the current instead of passing from the contact 40 through the conductor 77 to contact 25 will be transmitted through a conductor 78 to the contact 56, through its associated cell to the contact 41, through a conductor 79 to the contact 26, from whence it passes through the contact arms 21 to the pivot 22, and thence to the binding post 64 through the conductor 65. With the contact arm 21 in its latter described position, an additional cell is added to the circuit. If it is required to place another cell in the circuit, the contact arm 21 is moved into engagement with the contact 27, whereupon the current, instead of passing through the conductor 79, as hereinbefore described, is transmitted through conductor 80 to the contact 57, from whence it passes through the cell associated therewith to the contact 42, it being directed then to contact 27 through conductor 81, from whence it is transmitted to the binding post 64, through the contact arm 21, the pivot 22 and the conductor 65. Should it be desired to place another cell in circuit, making fifteen or the total number of cells connected, the contact arm 21 is moved to engagement with the contact 28, whereupon the current, instead of passing through the conductor 81, is transmitted through the conductor 82 to the contact 58, and thence through its associated cell to the contact 43, from whence it travels to contact 28 through the conductor 83, it being directed from contact 28 through the contact arm 21, the pivot 22, and the conductor 65 to the binding post 64.

Should it be desired to test any one of any number of the several cells 12, the closure 15 is opened to expose the carbon electrode 14, and the several spring-pressed contacts carried by the contact supporting plate 20, thus enabling one to connect a suitable measuring instrument, as, for example, an ammeter to the proper carbon electrode and an appropriate spring-pressed contact carried by the support 20, to enable the required test to be made. After the inferior cell or cells have been located, the same may be easily replaced without necessitating the removal or disconnecting any of the various electrical conductors included in the system embodying my invention.

Having thus described my invention, I claim:

1. A battery box adapted to receive a plurality of cells, said box being provided with a closure, a contact supporting plate associated with said closure, said plate being spaced from said closure, a cell engaging contact carrying support, said support being spaced from the bottom of said container, a divisional wall plate spaced from the rear side of said container, cell engaging contacts carried by said support, electrode engaging contacts carried by said plate, conductors arranged within the spaces afforded between said support and the bottom of said container, said wall and the rear side of said container, said plate and the top of said closure, said conductors being so connected with said cell engaging contacts and said electrode engaging contacts as to maintain the several cells in electric circuit when said closure is maintained in its closed position.

2. A battery box adapted to receive a plurality of cells, said box being provided with a closure, a contact supporting plate associated with said closure, said plate being spaced from said closure, a cell engaging contact carrying support, said support being spaced from the bottom of said container, a divisional wall plate spaced from the rear side of said container, cell engaging contacts carried by said support, electrode engaging contacts carried by the said plate, conductors arranged within the spaces afforded between said support and the bottom of said container, said wall and the rear side of said container, said plate and the top of said closure, said conductors being so connected with said cell engaging contacts and said electrode engaging contacts as to maintain the several cells in electric circuit when said closure is maintained in its closed position, and means for cutting out one or more of said cells from the circuit of the remaining cells.

3. A battery box adapted to receive a plurality of cells, said box being provided with a closure, electrode engaging contacts associated with said closure, a divisional wall plate arranged intermediate said cells and a side of said container, cell engaging contacts, and conductors arranged intermediate said wall plate and the side of said container, said conductors being so connected with said cell engaging contacts and said electrode engaging contacts as to maintain the several cells in electric circuit when said closure is maintained in its closed position.

4. A battery box adapted to receive a plurality of cells, said box being provided with a closure, a plurality of electrode engaging contacts associated with said closure, a cell engaging contact support arranged intermediate said cells and the bottom of said container, a plurality of cell engaging contacts carried by said support, and electric conductors arranged intermediate said support and the bottom of said container, said conductors being so connected with said cell engaging contacts and said electrode engaging contacts as to maintain the several cells in electric circuit when said closure is maintained in its closed position.

5. A battery box adapted to receive a plurality of cells, said box being provided with a closure, a plurality of electrode engaging contacts associated with said closure, a cell engaging contact support arranged intermediate said cells and the bottom of said container, a plurality of cell engaging contacts associated with said support, a divisional wall plate arranged intermediate said cells and one side of said container, a plurality of conductors arranged intermediate said support and the bottom of said container, the divisional wall plate and one side of said container, said conductors being so connected with said cell engaging contacts and said electrode engaging contacts as to maintain the several cells in electric circuit when said closure is maintained in its closed position.

6. A battery box adapted to receive a plurality of cells, said box being provided with a closure, a plurality of cell engaging contacts, a contact supporting plate carried by said closure, a plurality of electrode engaging contacts carried by said closure and adapted to electrically cooperate with said cells when said closure is maintained in its closed position, a plurality of conductors arranged intermediate said plate and said closure so connecting said cell engaging contacts and said electrode engaging contacts as to maintain said cells in electric circuit with each other when said closure is maintained in its closed position, and means cooperating with said electrode engaging contacts to maintain the same in intimate engagement with the electrodes of said cells and to urge said cells into intimate engagement with said cell engaging contacts, said means being in the form of casings having springs arranged therein and adapted to engage the electrode engaging contacts.

7. A battery box adapted to receive a plurality of cells, said box being provided with a closure, a contact supporting plate associated with said closure, a cell engaging contact carrying support, electrode engaging contacts carried by said plate, cell engaging contacts carried by said support, gaging contacts carried by said support, conductors arranged intermediate said support and the bottom of said container, said plate and the top of said closure, said conductors being so connected with said cell engaging contacts and said electrode engaging contacts as to maintain the several cells in electric circuit when said closure is maintained in its closed position.

8. A battery box adapted to receive a plurality of cells, said box being provided with a closure, electrode engaging contacts associated with said closure, a cell engaging contact carrying support, a divisional wall arranged in proximity to a side of said container, cell engaging contacts carried by said support, conductors arranged intermediate said support and the bottom of said container, said wall and a side of said container, said conductors being so connected with said cell engaging contacts and said electrode engaging contacts as to maintain the several cells in electric circuit when said closure is maintained in its closed position.

9. A battery box adapted to receive a plurality of cells, said box being provided with a closure, a plurality of electrode engaging contacts associated with said closure, a plurality of cell engaging contacts adapted to engage said cells, a wall plate arranged in proximity to the side of said container, electric conductors arranged intermediate said wall plate and a side of said container, said conductors being so connected with said cell engaging contacts as to maintain the several cells in electric circuit when said closure is maintained in its closed position, a plurality of switch engaging contacts electrically connected to said electrode and cell engaging contacts, and switch means adapted to engage said switch engaging contacts for cutting out one or more of said cells from the circuit of the remaining cells.

10. A battery box adapted to receive a plurality of cells, said box being provided with a closure, a plurality of electrode engaging contacts associated with said closure, a wall plate arranged in proximity to a side of said container, a cell engaging contact support arranged intermediate said cells and the bottom of said container, electric conductors arranged intermediate said wall plate and a side of said container, said conductors being so connected with said cell engaging contacts and said electrode engaging contacts as to maintain the several cells in electric circuit when said closure is maintained in its closed position, a plurality of switch engaging contacts electrically connected to said electrode and cell engaging contacts respectively, and switch means adapted to engage said switch engaging contacts for cutting out one or more of said cells from the circuit of the remaining cells.

11. A battery box adapted to receive a plurality of cells, a closure for said box, a plurality of electrode engaging contacts associated with said closure, a cell engaging contact support arranged intermediate said cells and the bottom of said container, a plurality of cell engaging contacts carried by said support, a plurality of electric conductors arranged intermediate said cell engaging contact support, said conductors being so connected with said cell engaging contacts and said electrode engaging contacts as to maintain the several cells in electric circuit when said closure is maintained in its closed position, a plurality of switch engaging contacts electrically connected to said electrode and cell engaging contacts respectively, and switch means adapted to engage said switch engaging contacts for cutting out one or more of said cells from the circuit of the remaining cells.

In testimony whereof, I have affixed my signature to this specification.

HENRY ROSENDAL DAM.